(12) United States Patent
Schlenk

(10) Patent No.: US 9,672,130 B2
(45) Date of Patent: Jun. 6, 2017

(54) METHOD AND APPARATUS FOR DETERMINING POWER CONSUMPTION PER INPUT/OUTPUT PORT OF A TELECOMMUNICATIONS NETWORK NODE

(71) Applicant: Alcatel Lucent, Boulogne Billancourt (FR)

(72) Inventor: Ralph Schlenk, Nuremberg (DE)

(73) Assignee: Alcatel Lucent, Boulogne-Billancourt (FR)

( * ) Notice: Subject to any disclaimer, the term of this patent is extended or adjusted under 35 U.S.C. 154(b) by 367 days.

(21) Appl. No.: 14/380,299

(22) PCT Filed: Mar. 21, 2013

(86) PCT No.: PCT/EP2013/055994
§ 371 (c)(1),
(2) Date: Aug. 21, 2014

(87) PCT Pub. No.: WO2013/143977
PCT Pub. Date: Oct. 3, 2013

(65) Prior Publication Data
US 2015/0023196 A1    Jan. 22, 2015

(30) Foreign Application Priority Data
Mar. 30, 2012    (EP) .................................... 12305387

(51) Int. Cl.
*H04J 1/16* (2006.01)
*G06F 11/30* (2006.01)

(52) U.S. Cl.
CPC ...... *G06F 11/3062* (2013.01); *G06F 11/3006* (2013.01); *G06F 11/3031* (2013.01); *G06F 11/3089* (2013.01)

(58) Field of Classification Search
CPC ............ G06F 11/3062; G06F 11/3006; G06F 11/3031; G06F 11/3089
(Continued)

(56) References Cited

U.S. PATENT DOCUMENTS

| 7,900,058 B2 | 3/2011 | Mabayoje et al. |
| 2003/0067278 A1* | 4/2003 | Nakamura ............... H02P 27/08 318/400.04 |

(Continued)

FOREIGN PATENT DOCUMENTS

| CN | 102076064 | 5/2011 |
| JP | 2010199872 | 9/2010 |

(Continued)

*Primary Examiner* — Peter Cheng
(74) *Attorney, Agent, or Firm* — Patti & Malvone Law Group, LLC

(57) ABSTRACT

In order to provides a practical way how detailed power consumption data can be made available to a control plane or network management system for optimizing the overall power consumption of an operator's network, the present invention proposes a method and related apparatus, which determines a power consumption per input/output port of a telecommunications network (NE) node by
- providing (S1) offline power measurement values per input/output port;
- performing (S2) online power consumption measurements on individual network cards (LC-1LC64; LC) each supporting several such input/output ports;
- aligning (S3) online and offline measurement values; and
- correlating (S4) determined power consumption values with the current usage of said input/output ports.

13 Claims, 6 Drawing Sheets

(58) Field of Classification Search
USPC .......................................................... 370/252
See application file for complete search history.

(56) References Cited

U.S. PATENT DOCUMENTS

| | | | |
|---|---|---|---|
| 2005/0162146 A1* | 7/2005 | Kobayashi | H02J 7/0068 |
| | | | 323/318 |
| 2005/0165581 A1* | 7/2005 | Roba | G05B 23/0272 |
| | | | 702/182 |
| 2007/0260896 A1* | 11/2007 | Brundridge | G06F 1/3203 |
| | | | 713/300 |
| 2009/0327784 A1 | 12/2009 | Shah et al. | |
| 2010/0205471 A1 | 8/2010 | Vavilala et al. | |
| 2010/0312874 A1 | 12/2010 | Jansen et al. | |
| 2011/0029798 A1 | 2/2011 | Munjal et al. | |

FOREIGN PATENT DOCUMENTS

| | | |
|---|---|---|
| JP | 2010206604 | 9/2010 |
| JP | 2011151332 | 8/2011 |

* cited by examiner

METHOD AND APPARATUS FOR DETERMINING POWER CONSUMPTION PER INPUT/OUTPUT PORT OF A TELECOMMUNICATIONS NETWORK NODE

FIELD OF THE INVENTION

The invention is base on a priority application EP12305387.8 which is hereby incorporated by reference.

The present invention relates to the field of telecommunications and more particularly to a method and related apparatus for determining a power consumption per input/output port of a telecommunications network node.

BACKGROUND OF THE INVENTION

Recent studies have shown that fixed-access communication infrastructure consumes a considerable amount of the overall energy produced. Using energy-saving equipment at the most energy-efficient network layer (i.e. the optical layer) will help to mitigate this issue.

SUMMARY OF THE INVENTION

It is desirable to use the installed network equipment efficiently in terms of power consumption and route connections in such a way that power consumption is reduced.

However, in state-of-the-art IP or optical transport networks, be they (G)MPLS controlled or traditionally provisioned, power consumption is not used as a routing metric, yet. This is not only because routing protocols are not energy-aware, the main reason is that power consumption readings of network nodes lack the level of information required for traffic engineering purposes.

The present invention provides a practical way how detailed power consumption data (i.e. per port/per circuit/per flow) can be made available to a control plane or network management system for optimizing the overall power consumption of an operator's network.

These and other objects that appear below are achieved by determining a power consumption per input/output port of a telecommunications network node by
 providing offline power measurement values per input/output port;
 performing online power consumption measurements on individual network cards each supporting several such input/output ports;
 aligning online and offline measurement values; and
 correlating determined power consumption values with the current usage of said input/output ports.

Through this, reliable and realistic power consumption values per port are obtained, which can than be used as routing metrics in a least-cost routing algorithm to route connections most power-efficiently.

BRIEF DESCRIPTION OF THE DRAWINGS

Preferred embodiments of the present invention will now be described with reference to the accompanying drawings in which.

DETAILED DESCRIPTION OF THE INVENTION

Existing network equipment does not provide means for reading the current power consumption. If anything, power consumption could be made available at network element level, i.e. for an entire router or switch including cooling (fans) etc. It would in principle be possible to make more detailed power consumption information per line card, i.e. per slot of the network node available to the operator. This would require only moderate hardware modifications. Such values would provide the possibility for the operator to optimize cooling and energy distribution in the central office.

Line cards, however, typically carry a number of I/O ports. Simply dividing the per-slot power consumption by the number of ports per slot to estimate a "per-port" power consumption value does not provide satisfactory results. This is because, as will be shown in more detail below, the per-port power consumption varies significantly between different ports, depending on the actual operating mode. It has to be understood that these operating modes are mostly internal to the system and therefore not visible at external network management interfaces.

In order to achieve an optimization of the configuration of a transmission network in terms of power consumption, correct and detailed information of the per-port power consumption are required. The reasons for that are twofold. First, energy consumption of a shelf or its slots is not directly related the energy consumed for switching a particular packet flow or circuit. For a network-wide optimization, more detailed metrics must be used, which depend on correct per-port values. Second, today's network switches have reached system capacities of several Terabytes per second, requiring virtualization techniques to use the equipment efficiently. Power consumption and optimization targets for the various virtual switches and their corresponding ports may be different, though.

Figure 1:
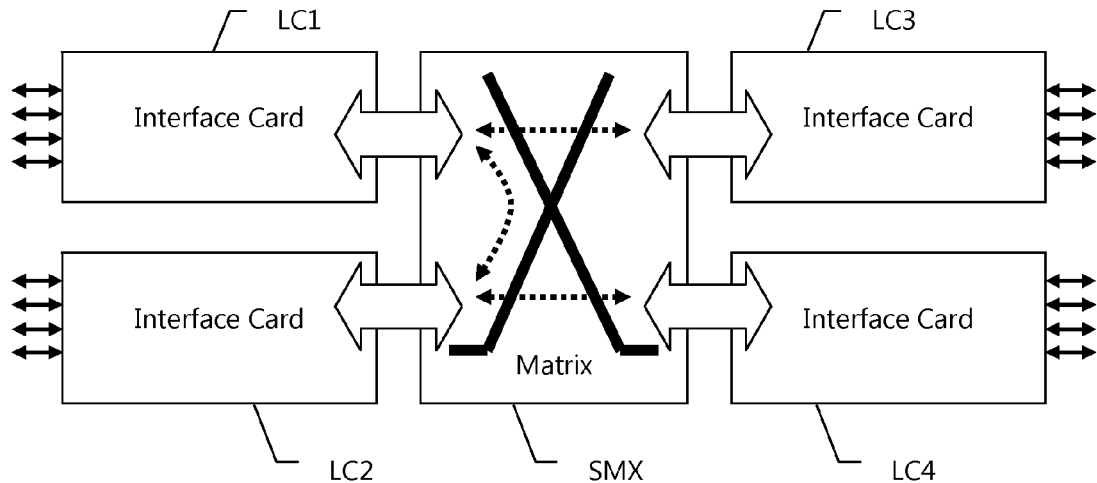
FIG. 1 shows a block diagram of a network node.

FIG. 1 depicts a network switch that is divided into several entities. The switch has a central switch matrix SMX and four line cards LC1-LC4, connected to the switch matrix SMX via an internal backplane. Each line card has four I/O ports. For example, line cards LC1-LC4 can have a total capacity of 40 Gb/s with 4×10 Gb/s I/O port. It should be understood that real switches usually can house more than four line cards and line cards can carry more than just 4 I/O ports.

Typical network nodes have a central controller (not shown) plus local controllers arranges on each network card.

The optical interfaces as such are typically implemented with pluggable modules known for example as XFP (standing for "10 Gigabit Small Form Factor Pluggable") modules. I/O ports can be equipped with different type of optical interface modules such as short reach, long reach, or colored single wavelength interfaces for WDM application. Moreover, I/O ports can be designed or configured for different kind of signal formats such as, for a 10 Gb/s port, as 10 G Ethernet, STM-64 (SDH), OC-192 (SONET), both according to ITU-T G.707, or OTU2 (OTN) according to ITU-T G.709.

Some of these equipment components can be under external control, while others are managed locally. Thus, the ports cannot be simply treated equally but these constraints need to be taken into account when determining reliable power consumption values.

It is also not practical to assign parts of the potential high power consumption of inefficiently operated ports to ports operated in more efficient operating modes, maybe even by another customer. Therefore, a technique is required that attributes power consumption to the correct entities. However, detailed power consumption values can only be measured down to a certain level. That is because power modules on network cards usually feed different components at the same time, which makes it impossible to separate the data. Moreover, the combination of various operation modes and power saving options cannot be handled easily with measurements alone. Therefore, a break down of the obtained values on port or even lower levels is not directly possible.

Figure 2:
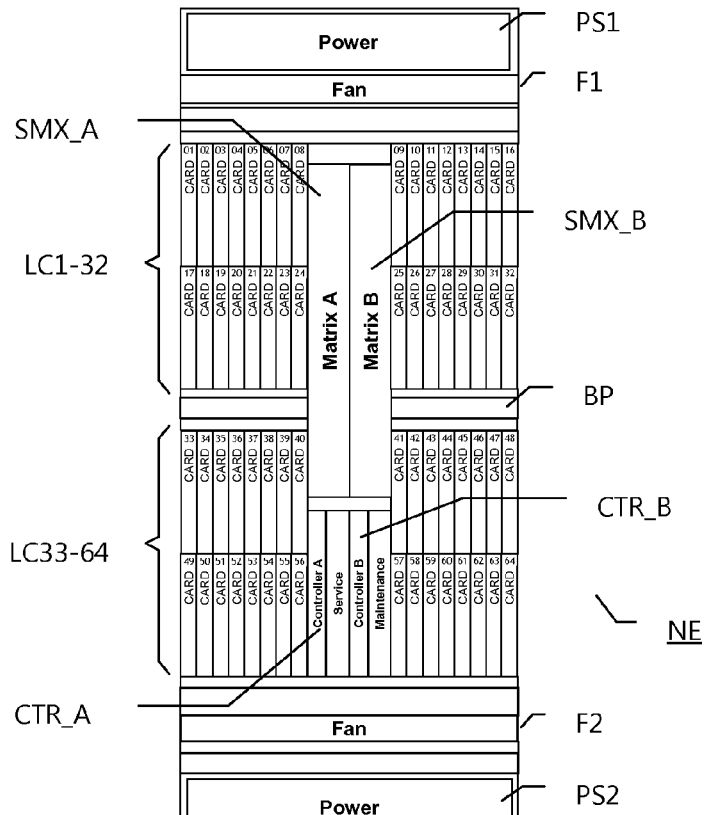
FIG. 2 shows the components of a network node installed in a telecom rack.
Figure 3:
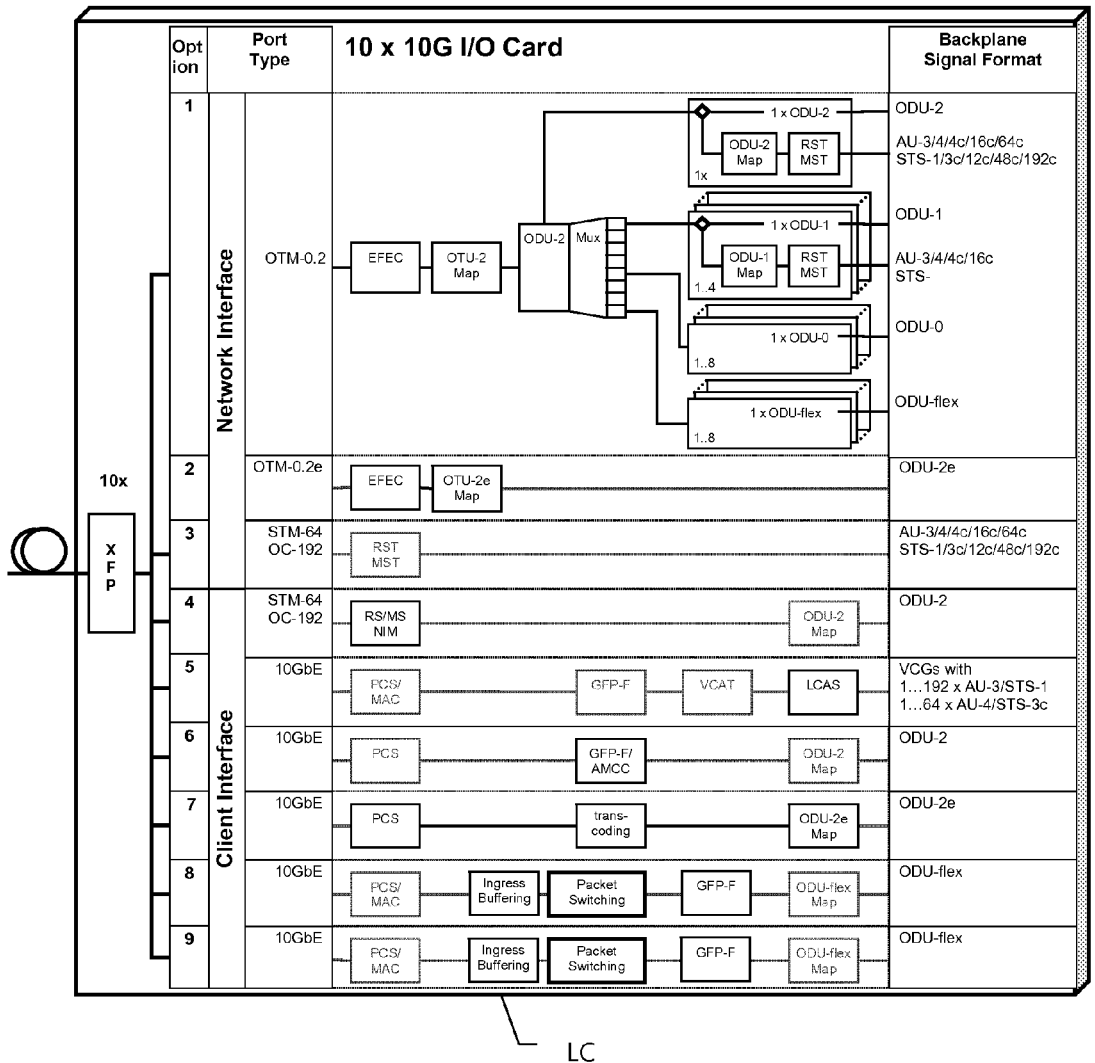
FIG. 3 shows an 10×10 G network card and possible configuration options of each port.

FIGS. 2 and 3 visualize this complexity for a current generation high-density switch.

FIG. 2 shows a front view of a network node NE installed in a standard 19" telecom rack. At the top and bottom of the rack are two redundant power supplies PS1, PS2 and two fans/cooling units F1, F2, each having redundant fan motors. The a back plane BP interconnects the various cards of the network node. In the middle are two redundant switching cards SMX_A, SMX_B. Below the switching cards are two redundant controller boards CTR_A, CTR_B as well as service and maintenance boards. At both sides of the matrix boards are slots for in total 64 line cards LC1-LC64. Each line card can carry up to 10×10 G I/O ports.

When determining the power consumption related to single interface ports, the power consumption of common equipment such as power supply, fans, controllers, etc., needs to be accounted for and attributed to the right ports, depending on the actual port operation mode.

In FIG. 3, the operation modes of a line card LC with 10×10 Gb/s ports are shown. This line card is optimized for the optical transport network (OTN). Each line and backpanel port can be operated in different transmission modes, e.g. 10 Gigabit Ethernet, OC-192 SONET or OTU2. In addition, other features like FEC (forward error correction), ODU multiplexing, packet processing, or performance monitoring can be configured. The power consumption of the ports is to the most part dependent on these settings.

In particular, line card LC has 10 optical transceiver modules XFP, which can be either b&w for long or short reach or colored single wavelength transceivers.

The electrical processing at the I/O depends on the signal format and can be either of the nine options 1-9 shown in FIG. 3. Options 1-3 relate to network interfaces, which can be adapted for either OTN or SDH/SONET format. For OTN, signal formats can be either OTU-2 (option 1) or OTU-2e (option 2). Processing of OTU-2 signals comprises enhanced forward error correction processing EFEC, OTU-2 mapping, ODU-2 processing and multiplexing of lower layer signals, which can be any of the variants shown under option 1, i.e. 1×ODU-2, 4×ODU-1 with or without ODU-1 mapping for SDH payload, 8×ODU-0, up to 8×ODU-flex, or any suitable combination of the aforementioned.

OTU-2e is an over-clocked line rate of 11.0957 Gbits/s±100 ppm for mapping 10 G Ethernet LAN signals. Signal processing contains enhanced forward error correction processing EFEC and OTU-2e mapping.

Option 3 is an SDH line interface for signal format STM-64 (ETSI) or OC-192 (ANSI), which performs regenerator and multiplex section termination functions RST/MST.

Options 4 to 9 relate to client interfaces, which can be either SDH/SONET or 10 G Ethernet. The SDH client interface (option 4) performs regenerator section and multiplex section monitoring functions RS/MS NIM and mapping into ODU-2 for transport through the network on OTN layer. This is necessary, because the network must not access the SDH overhead sections, as these belong to and must be accessed by the client layer, only.

For 10 G Ethernet client signals, a number of transport options (5-9) are available. First, 10 G ETH can be transported as payload in a native SDH signal (option 5). At the Ethernet layer, the interface performs PCS (physical coding sublayer) and MAC (media access control) termination. The mapping into SDH transport frames is then via Generic Framing Protocol (GFP), Virtual Concatenation (VCAT) and LCAS (Link Capacity Adjustment). GFP provides a new and more efficient Layer 2 encapsulation scheme for data traffic over SONET/SDH. VCAT allows the logical concatenation of multiple SONET/SDH frames. Whereas, LCAS allows to right size those virtual concatenated paths. Together VCAT and LCAS allow SONET/SDH to better fit bursty data traffic.

The four remaining options related to Ethernet mappings into OTN frames. In option 6, 10 G ETH can be mapped into ODU-2 using GFP-F with Preamble Transparency (so called AMCC Mapping Mode) using unused OTN OH to preserve preamble-bytes of Ethernet frame and transport Ordered-Sets as described in ITU G.Sup43, section 7.3.

In option 7, synchronous 10 G ETH can be transported using transcoding and bit-transparent mapping into over-clocked OTU-2e with a line rate of 11.097 GB/s.

In options 8 and 9, 10 G ETH frames can be buffered, switched, and mapped into an adjustable number of ODU-flex timeslots using GFP-F encapsulation. Depending on the configuration, the switch function can comprise filtering, classifying, metering, policing, counting, or queuing.

It should be understood that all these different transport options have different power consumption, but the configuration of these options may not be fully visible at the management interfaces.

When determining the power consumption related to single interface ports, the power consumption of common equipment needs to be attributed to the right ports depending on the actual port operation mode.

It would be in principle possible to store "offline" measured total power consumption values for all relevant configuration scenarios, in order to retrieve them later during operation. This may be possible for a small number of configurations on coarse level of details like it is the case for equipment with lower complexity. However, if more complex network nodes are involved, this becomes less practical because of following reasons:

The usually very high number of configuration options leads to a high amount of data that needs to be measured, stored, and maintained over the product releases. This is cumbersome and prone to failures.

Building blocks can be exchanged or upgraded on the fly. An example are XFP (10 Gigabit Small Form Factor Pluggable) optical modules that are available with different reaches and features and have different power consumption. Another example are FPGAs that can be re-programmed even during operation and show high variations in power consumption. Realistically, not all of these combinations can be measured in advance.

Power consumption of many devices is dependent on board temperature. It has been detected that some devices can show up to 300% variation for certain operation modes.

Power consumption of fans and other subsystems is dependent on environment temperature.

Component derating over time can not be accounted for.

Figure 4:
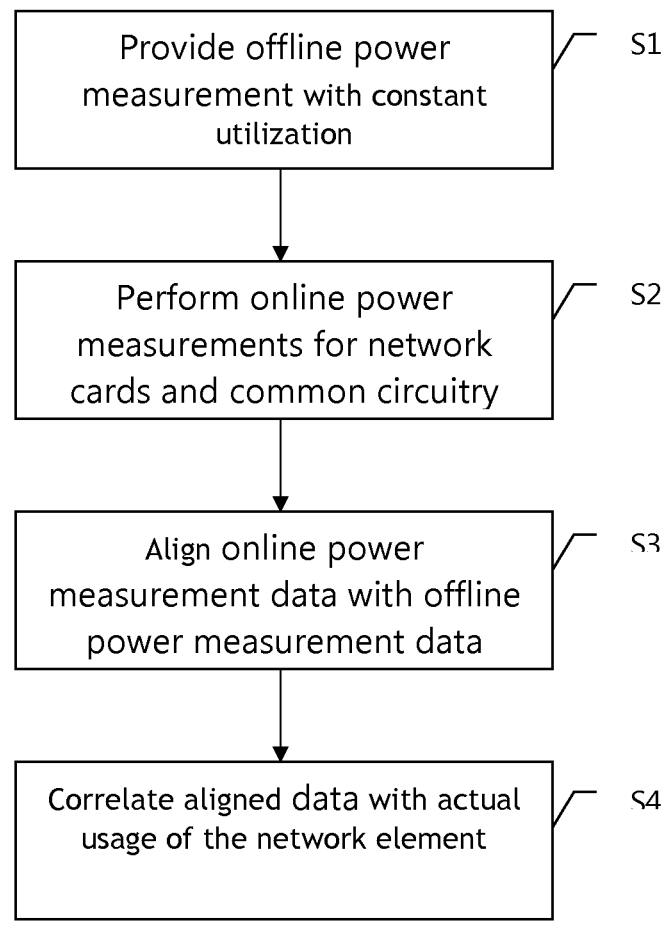
FIG. 4 shows a flow chart of the subject power value determination method.

The present embodiment therefore provides a combination of offline and online measurements to obtain finegrained power consumption data. The flow chart of FIG. 4 shows the four steps of the present method. In particular, measurement data about device-/hierarchy-based power consumption with constant utilization of common circuitry/equipment is provided offline in step S1 e.g. during development phase and stored in hardware of the network node. During operation (i.e. online), total power consumption measurements are performed in step S2 on individual network cards, plus utilization-sensitive power consumption of common circuitry/equipment. The online measurement data is then aligned in step S3 with the device-/hierarchy-based power consumption values stored in local hardware, and adapted in step 4 to the actual usage of the network node. Steps S1 to S4 will be explained in more detail below.

Step S1: Offline Power Consumption Measurements

Figure 5:
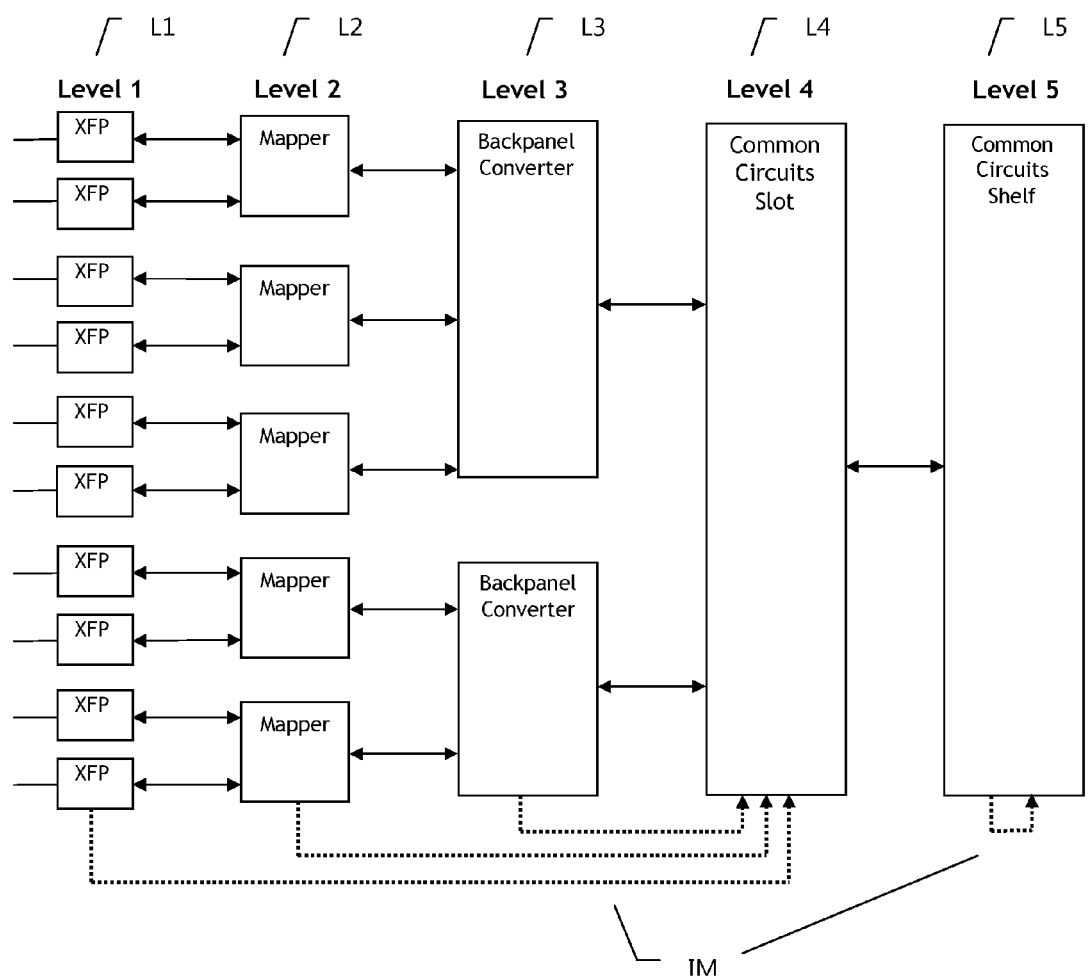
FIG. 5 shows a hierarchical model of the components of the network card of FIG. 4.

FIG. 5 depicts a simplified model of the aforementioned 10×10 G network card. The model is divided into several levels, depending on a device/subsystem hierarchy. The level L1 relates to the individual input/output port and is implemented with XFP modules, which may be, as mentioned before, of different type. Level L2 contains a function called mapper, which performs framing and encapsulation of payload traffic. Each mapper in this embodiment serves two XFP modules. Level L3 is the backplane converter, which formats the signals for the internal backplane format and drives the backplane bus. A backplane converter serves two or three mappers, respectively. Level L4 is the circuitry common to the entire network card slot and level L5 is the circuitry common to the entire shelf.

The hierarchy in this context is related to the dependence on specific ports. The dotted lines indicate the impact IM and dependency on traffic load. Real models for network cards may be more complex, in particular if processing elements like network processors, traffic managers etc. are employed.

Figure 6:
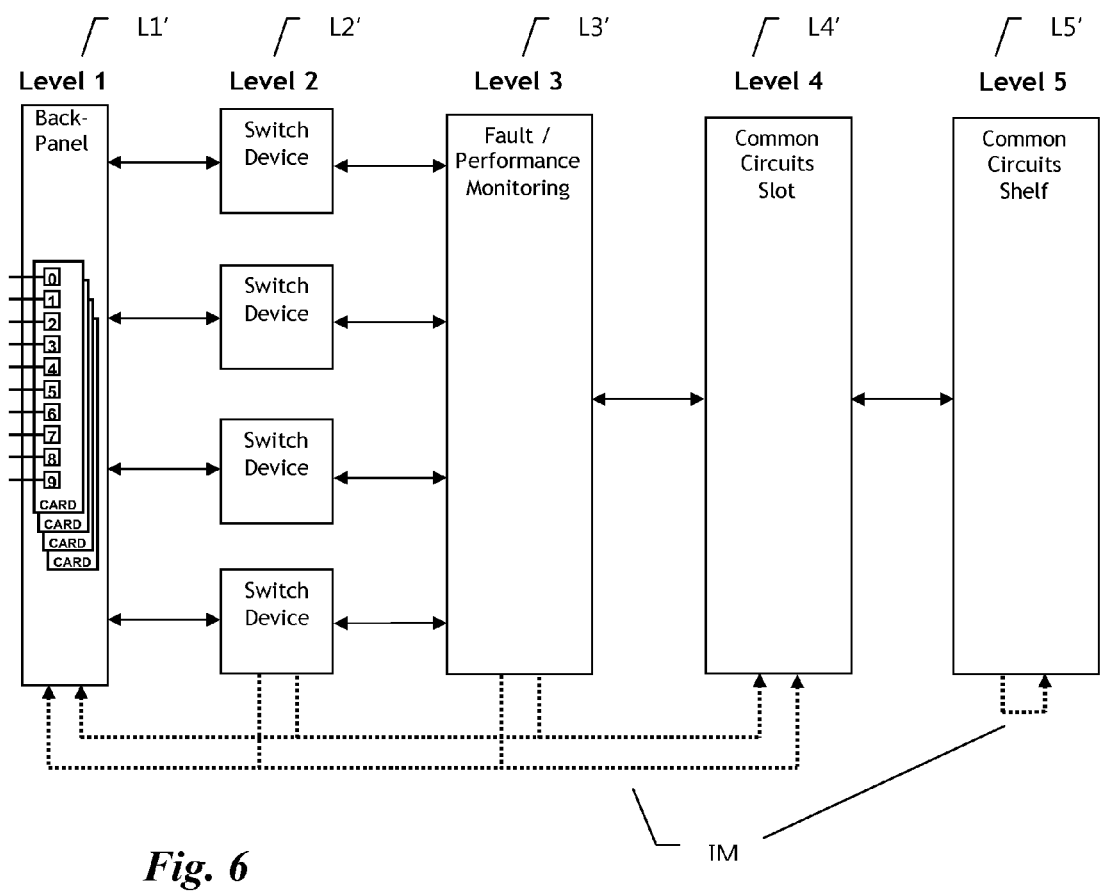
FIG. 6 shows a hierarchical model of the central switch matrix of the network node of FIGS. 1 and 2.

Similar models can be derived for other parts of the system, e.g. the switch matrix as shown in FIG. 6. The hierarchy for the switch matrix contains as level L1' the back panel, that interconnects the matrix with the network cards, as level L2' a number of switch devices. Level L3' contains the fault and performance monitoring functions, which trigger protection switching actions in the switch matrix. As in the interface board hierarchy, levels L4' and L5' are the circuitry common to the entire switch card slot and the circuitry common to the entire shelf.

In the subject embodiment, it is proposed to drastically reduce the number of measured configuration scenarios and so increase the maintainability by:
  measuring/determining the impact of each hierarchy level independently and at two different board temperatures, and
  excluding the impact of "utilization-dependent" common circuitry (dotted lines in FIGS. 5 and 6) by holding the utilization at a constant level during measurements The first bullet point exploits two facts:
a) Measuring device hierarchy levels separately makes power measurements in the development phase maintainable. Measurement values can for instance be stored on each device in an EEPROM. Thus, hardware and software can be decoupled if exchangeable building blocks carry their own power consumption values with them.

b) The temperature dependence on the proposed device hierarchy level often follows a linear dependency. Therefore two temperature values are sufficient for an extrapolation to be sufficiently accurate. For most of the devices, temperature dependency will be negligible, however some show an increase of up to 2 W between 30° C. and 50° C. ambient temperature.

A drastic simplification is achieved through the second bullet point. The power consumption of the circuitry that is common to all ports is partly fixed, partly dependent on the utilization of the network card. In particular, the efficiency of dc-dc power converters varies depending on the drawn current: In an embodiment, the efficiency of a commercially available converter ranges from 70% to 88% for a 12V→1.2V module. Table 1 shows the power conversion losses of the converter in the embodiment. Note that current high-density network nodes may consume more than 10 kW, making the power conversion losses a relevant factor.

TABLE 1

Power conversion loss of a typical DC-DC converter

| Output Power | Efficiency | Power Conversion Loss |
|---|---|---|
| 1 W | 70% | 0.4 W |
| 5 W | 88% | 0.7 W |
| 12 W | 85% | 2.1 W |

Together with information on power conversion loss profiles, the above described measurements allow to determine the correct power consumption per port with sufficient accuracy. In particular, the nonlinear power consumption of common circuitry such as dc-dc converters can thus be shared in a fair manner between ports in operation.

A sample implementation of the power consumption table (shown for one temperature only) that will be stored in the system is given below as Table 2. Note that for level L4, only the fixed part is given, the utilization-dependent power values need to be added later (Pwr1V2, Pwr3V3—corresponding to the dotted lines IM of FIG. 4). Unlike other common circuitry, these additional power values will not be shared equally among all active ports, but weighted for the levels indicated in the first column of Table 2, so that ports that use high-power devices get a larger share.

For example, the power consumption of the network card in this scenario, with the first port operated in Mode A with long reach optics, and all other ports completely powered down is 10 W+15 W+7 W+37 W+4×4 W+12 W+9×0 W=88 W (with missing contributions from Pwr1V2 and Pwr3V3).

TABLE 2

Offline power consumption values stored on a network card

|  | Ports | Normal | Pwrsave |
|---|---|---|---|
| Level 5 | xxxxxxxxx | 10 W | 5 W |
|  | Ports | Normal | Pwrsave |
| Level 4 | xxxxxxxxx | 15 W | 2 W |
|  | Ports | Normal | Pwrsave |

TABLE 2-continued

Offline power consumption values stored on a network card

| | | | |
|---|---|---|---|
| Level 3 | xxxxxxoooo | 7 W | 1 W |
| Pwr3V3 | ooooooxxxx | 5 W | 1 W |

| | Ports | Mode A | Mode B | Mode C | ... | Pwrsave |
|---|---|---|---|---|---|---|
| Level 2 | xxoooooooo | 37 W | 34 W | 25 W | ... | 4 W |
| Pwr1V2 | ooxxoooooo | 36 W | 33 W | 25 W | ... | 4 W |
| Pwr3V3 | ooooxxoooo | 36 W | 32 W | 24 W | ... | 4 W |
| | oooooxxoo | 35 W | 32 W | 24 W | ... | 4 W |
| | oooooooxx | 35 W | 32 W | 24 W | ... | 4 W |

| | Ports | Long | Medium 1 | Medium 2 | Short | Pwrsave |
|---|---|---|---|---|---|---|
| Level 1 | xooooooooo | 12 W | 10 W | 8 W | 6 W | 0 W |
| | oxoooooooo | 12 W | 10 W | 8 W | 5 W | 0 W |
| | ooxooooooo | 12 W | 9 W | 8 W | 5 W | 0 W |
| | oooxoooooo | 11 W | 9 W | 7 W | 5 W | 0 W |
| | ooooxooooo | 11 W | 9 W | 7 W | 5 W | 0 W |
| | oooooxoooo | 11 W | 8 W | 7 W | 5 W | 0 W |
| | ooooooxooo | 10 W | 8 W | 7 W | 5 W | 0 W |
| | oooooooxoo | 10 W | 8 W | 7 W | 5 W | 0 W |
| | ooooooooxo | 10 W | 8 W | 7 W | 5 W | 0 W |
| | ooooooooox | 10 W | 8 W | 7 W | 5 W | 0 W |

Step S2: Online Power Consumption Measurements

Figure 7:
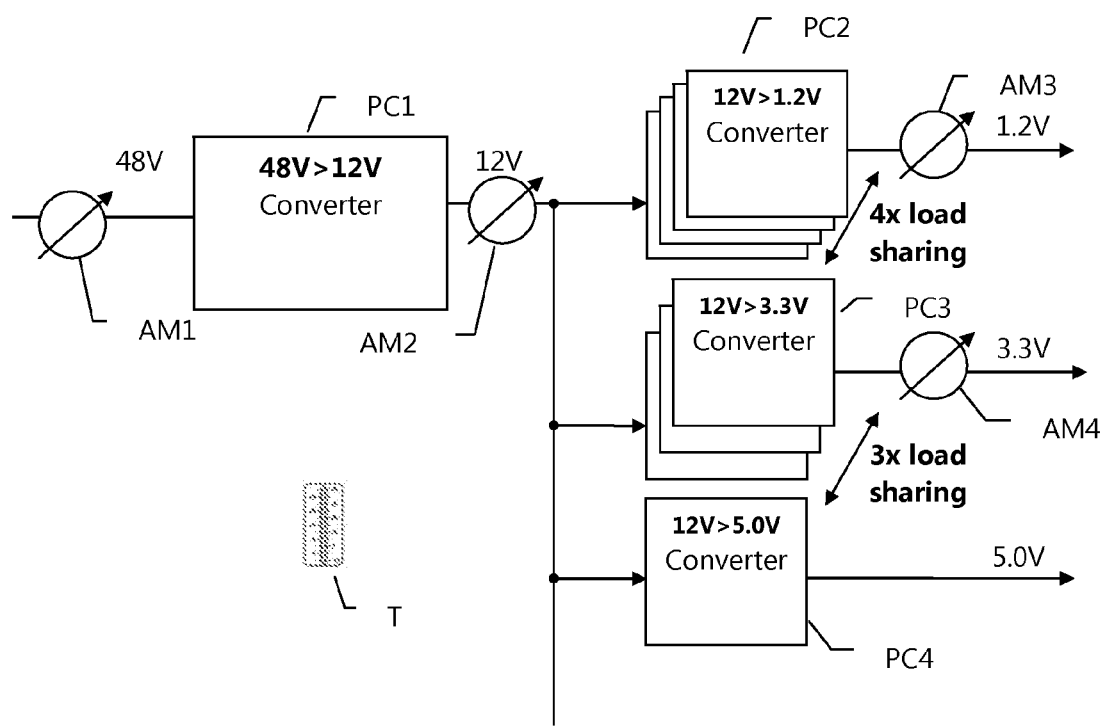
FIG. 7 shows a power converter arrangement with integrated ammeters.

FIG. 7 shows a power converter circuit installed on a network card. The network card receives a supply voltage of 48 V. A first DC-DC converter PC1 converts the voltage down to 12 V. This voltage is fed in parallel to a number of second level power converters. A set of four parallel power converters PC2 generate a 1.2 V output voltage. A set of three power converters PC3 generate a 3.3 V output voltage and a power converter PC4 generates a 5 V output voltage. Ampere meters AM1-AM4 measure the current before and after power converter PC1 and after each of the power converters PC2 and PC3. In addition, a thermo sensor T is installed on the network card to measure the board temperature.

The measured values are used to determine:
the per-slot power consumption
and, as input to the power consumption table (see Table 2):
the additional power values Pwr1V2 and Pwr3V3 in the example above that need to be shared among all active ports, and
the actual board temperature to determine temperature-related corrections Step S3: Aligning Online and Offline Measurements A third aspect of the present embodiment is to align the online and offline measurement values in a correct manner. The issue is that the stored offline power values are detailed but accurate only for the previously measured scenario. The online measured values are coarse but more accurate. In order to account for the measurement errors (which could be due to component derating or measurement inaccuracies), the difference between offline and online measurements is calculated and spread across all ports. To acknowledge the fact that higher measured values also have higher absolute measurement errors, these additional per-port values are weighted with the per-port power consumption.

Step S4: Linking Determined Power Consumption with Actual Usage

Reporting solely per-port power consumption values towards the management interface may not be sufficient. The values need to be linked to the actual port usage (and also port data rate, if W per Gb/s values shall be calculated). Again, not all of that information is available at the management interface in existing equipment and therefore needs to be evaluated at network element level.

A network operator separates his network node into several logical partitions. Some of the ports may be operated by himself, e.g. via the network operator's control plane, some may be leased to customers, some may be unmanaged (i.e. not used). An operated (i.e. used) port can either carry traffic or can be sleeping, e.g. switched to power-save mode.

For input/output ports operating in packet mode (options 5-9 in FIG. 3), the committed information rate (CIR) than port is configured to serve will be taken into account as port usage.

If the power consumption of unmanaged/sleeping/idle ports is added to active ports as proposed, the per port power consumption values can be used to better optimize the network node usage on a network level: Control protocols will not only concentrate traffic on energy-efficient ports but also try to "fill" the available ports before activating new line cards or nodes (because highly utilized network nodes exhibit a lower per port power consumption). This opens the possibility to put more equipment into power-save mode and thus to save energy overall.

In the following, an example will given for a power calculation according to the above embodiment. Steps S3 and S4 will be explained in more detail.

In this (simplified) example, only the power consumption of one 10×10 G card, which has a maximum power consumption of 390 Watts, will be investigated, without the contributions of central switch, fans, etc. The operator controls ports 1+2, a customer controls ports 3+4, and ports 5-10 are not in use. On the card, following currents have been measured online, see FIG. 7:

TABLE 3

Measured total power consumption of the network card

| Voltage | 48 V | 3.3 V | 1.2 V |
|---|---|---|---|
| Current | 3.9 A | 10 A | 7.5 A |
| Power | 187 W | 33 W | 9 W |

Following the reasoning of steps S1 and S2, the power consumption of each port can be calculated as follows:

TABLE 4

Calculation of power consumption per port

| (in W) | Lvl 1 | Lvl 2 | Lvl 3 | Lvl 4 | Lvl 5 | Sum | Pwr1V2 | Pwr3V3 | Total |
|---|---|---|---|---|---|---|---|---|---|
| Port 1 | 12 | 37/2 | 7/6 | 15/10 | 10/10 | 34.2 | (37/2)/74*9 | (37/2 + 7/6)/(74 + 8)*33 | 44.4 |
| Port 2 | 12 | 37/2 | 7/6 | 15/10 | 10/10 | 34.2 | (37/2)/74*9 | (37/2 + 7/6)/(74 + 8)*33 | 44.4 |
| Port 3 | 5 | 25/2 | 7/6 | 15/10 | 10/10 | 21.2 | (25/2)/74*9 | (25/2 + 7/6)/(74 + 8)*33 | 28.2 |
| Port 4 | 5 | 25/2 | 7/6 | 15/10 | 10/10 | 21.2 | (25/2)/74*9 | (25/2 + 7/6)/(74 + 8)*33 | 28.2 |
| Port 5 | 0 | 4/2 | 7/6 | 15/10 | 10/10 | 5.6 | (4/2)/74*9 | (4/2 + 7/6)/(74 + 8)*33 | 7.1 |
| Port 6 | 0 | 4/2 | 7/6 | 15/10 | 10/10 | 5.6 | (4/2)/74*9 | (4/2 + 7/6)/(74 + 8)*33 | 7.1 |
| Port 7 | 0 | 4/2 | 1/4 | 15/10 | 10/10 | 4.8 | (4/2)/74*9 | (4/2 + 1/4)/(74 + 8)*33 | 5.9 |
| Port 8 | 0 | 4/2 | 1/4 | 15/10 | 10/10 | 4.8 | (4/2)/74*9 | (4/2 + 1/4)/(74 + 8)*33 | 5.9 |
| Port 9 | 0 | 4/2 | 1/4 | 15/10 | 10/10 | 4.8 | (4/2)/74*9 | (4/2 + 1/4)/(74 + 8)*33 | 5.9 |
| Port 10 | 0 | 4/2 | 1/4 | 15/10 | 10/10 | 4.8 | (4/2)/74*9 | (4/2 + 1/4)/(74 + 8)*33 | 5.9 |
| Sum | | 74 | 8 | | | | | | 183 |

As described in step S3 "Aligning online and offline measurements", the difference of 4 Watts between measured and calculated values has to be distributed between the ports:

TABLE 5

Aligned power consumption per port

| | Calculated | Difference | Power/Port (raw) |
|---|---|---|---|
| Port 1 | 44.4 | (44.4/183)*4 | 45.4 |
| Port 2 | 44.4 | (44.4/183)*4 | 45.4 |
| Port 3 | 28.2 | (28.2/183)*4 | 28.8 |
| Port 4 | 28.2 | (28.2/183)*4 | 28.8 |
| Port 5 | 7.1 | (7.1/183)*4 | 7.3 |
| Port 6 | 7.1 | (7.1/183)*4 | 7.3 |
| Port 7 | 5.9 | (5.9/183)*4 | 6.0 |
| Port 8 | 5.9 | (5.9/183)*4 | 6.0 |
| Port 9 | 5.9 | (5.9/183)*4 | 6.0 |
| Port 10 | 5.9 | (5.9/183)*4 | 6.0 |
| Sum | 183 | | 187 |

These values can now be re-assigned (step S4) depending on their operational state (used/unused). In this particular case, ports 5-10 are not in operation and therefore do not belong to any customer using that network node. Their power consumption is common to all used ports (like e.g. fans) and therefore needs to be allocated evenly:

TABLE 6

Power consumption per active port

| | Power/Port (corrected) |
|---|---|
| Port 1 | 55.1 W |
| Port 2 | 55.1 W |

TABLE 6-continued

Power consumption per active port

| | Power/Port (corrected) |
|---|---|
| Port 3 | 38.4 W |
| Port 4 | 38.4 W |
| Sum | 187 W |

Note that if ports 5-10 in the above embodiment are used again by the operator (but are left in power-save for the time being) Table 4 instead of Table 6 applies. It can be seen that the reported power consumption of ports 1-4 has decreased, so the routing protocols might decide to route even more traffic via that higher utilized and thus more energy-efficient network node. Actual traffic on ports 5-10 would further decrease the power consumption of ports 1-4.

For the sake of comparison and to highlight the impact of the proposed solution, some alternative calculations are given below:

TABLE 7

Maximum total power consumption/number of ports

| Port 1 | Port 2 | Port 3 | Port 4 | Port 5 | Port 6 | Port 7 | Port 8 | Port 9 | Port 10 |
|---|---|---|---|---|---|---|---|---|---|
| 39.0 W | 39.0 W | 39.0 W | 39.0 W | 39.0 W | 39.0 W | 39.0 W | 39.0 W | 39.0 W | 39.0 W |

TABLE 8

| Measured total power consumption/number of ports | | | | | | | | | |
|---|---|---|---|---|---|---|---|---|---|
| Port 1 | Port 2 | Port 3 | Port 4 | Port 5 | Port 6 | Port 7 | Port 8 | Port 9 | Port 10 |
| 18.7 W | 18.7 W | 18.7 W | 18.7 W | 18.7 W | 18.7 W | 18.7 W | 18.7 W | 18.7 W | 18.7 W |

TABLE 9

| Measured power consumption/number of active ports | | | |
|---|---|---|---|
| Port 1 | Port 2 | Port 3 | Port 4 |
| 46.7 W | 46.7 W | 46.7 W | 46.7 W |

It can be seen that all three methods, which in principle could be used for state-of-the-art equipment because of their simplicity, vary considerably. The invention proposes a way to measure the power consumption of all used ports more accurately. This is a prerequisite for energy-aware routing protocols. Routing protocols as such are beyond the scope of this invention. It should be understood, however, that a skilled person would be able to adapt existing routing protocols to apply the power consumption values as described above as routing metrics in well known least-cost routing algorithms.

In the subject embodiment, only the power consumption of the network cards has been determined. It should be understood that the power consumption of other equipment components such as the switch matrix, fans, power supply, etc., can be calculated in a similar way and assigned to the I/O ports in use. However, the power consumption of the network cards in the above scenario is predominant, so that the difference is not significant. Moreover, the aim to make routing decisions more power efficient would be achieved even without the contributions of other common equipment components.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

It should be understood, that one or more of the above described steps can be performed by a central controller of the network node or in a distributed fashion by various controllers arranged for example on the various network cards, under the control of a central controller.

The description and drawings merely illustrate the principles of the invention. It will thus be appreciated that those skilled in the art will be able to devise various arrangements that, although not explicitly described or shown herein, embody the principles of the invention. Furthermore, all examples recited herein are principally intended expressly to be only for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The invention claimed is:

1. A method of determining a power consumption per input/output port of a telecommunications network node having a number of network cards each carrying one or more input/output ports, comprising:
preconfiguring offline measured power consumption values per input/output port;
performing online power consumption measurements for individual network cards each supporting several of said input/output ports;
aligning said online power consumption measurements and said offline measured power consumption values, wherein said aligning said online power consumption measurements and said offline measured power consumption values comprises determining a mismatch between a power consumption calculated from said offline measured power consumption values and said online power consumption measurements and assigning a difference to said input/output ports weighted based on per input/output port power consumption; and
correlating determined power consumption values with a current usage of said input/output ports.

2. The method according to claim 1, wherein the network card is modelled into several hierarchical building blocks and said offline measured power consumption values are provided per each block.

3. The method according to claim 1, wherein said offline measured power consumption values are provided for different configurations of said input/output ports.

4. The method according to claim 1, wherein said offline measured power consumption values are determined at a constant utilization of said input/output ports.

5. The method according to claim 1, wherein said offline measured power consumption values are stored in a non-volatile memory on each of said network cards.

6. The method according to claim 1, wherein said offline measured power consumption values are taken at two different temperatures, and wherein a current temperature is measured, and wherein corrected offline measured power consumption values are determined through a linear regression.

7. The method according to claim 1, further comprising separately measuring additional power consumption values and assigning these to individual input/output ports in accordance with least-cost routing algorithms.

8. The method according to claim 1, further comprising determining a power conversion loss from a determined power consumption using predetermined power conversion loss profiles of one or more power converters of said network node and attributing the power conversion loss to said input/output ports in said weighted manner.

9. The method according to claim 1, wherein said correlating determined power consumption values with the current usage of said input/output ports comprises attributing power consumption of unmanaged input/output ports to the other active input/output ports in said weighted manner.

10. The method according to claim 9, wherein said correlating determined power consumption values with the current usage of said input/output ports is performed for each network card separately.

11. A network node, comprising:
a number of network cards, each carrying one or more input/output ports, wherein said network cards comprise measurement devices for performing online power consumption measurements for individual network cards each supporting several input/output ports;
a switch matrix configurably interconnecting said network cards to switch connections from any to any of said input/output ports; and
one or more controllers configured to:
align said online power consumption measurements and offline measured power consumption values per input/output port by determining a mismatch between a power consumption calculated from said offline measured power consumption values and said online power consumption measurements and assigning a difference to said input/output ports weighted based on per input/output port power consumption, said offline measured power consumption values being preconfigured to said network node; and
correlate determined power consumption values with a current usage of said input/output ports.

12. The network node according to claim 11, wherein said network cards comprise a non-volatile memory storing said offline measured power consumption values for a respective network card on its input/output ports.

13. The network node according to claim 11, wherein said network cards comprise one or more power converters, and wherein ammeters are provided in front of and behind one or more of said one or more power converters to provide said online measured power consumption values.

* * * * *